US010258920B1

(12) United States Patent
Bader

(10) Patent No.: US 10,258,920 B1
(45) Date of Patent: *Apr. 16, 2019

(54) METHODS FOR IMPROVING AND ENHANCING OIL RECOVERY

(71) Applicant: Mansour S. Bader, College Station, TX (US)

(72) Inventor: Mansour S. Bader, College Station, TX (US)

(*) Notice: Subject to any disclaimer, the term of this patent is extended or adjusted under 35 U.S.C. 154(b) by 267 days.

This patent is subject to a terminal disclaimer.

(21) Appl. No.: 14/544,835

(22) Filed: Feb. 23, 2015

Related U.S. Application Data

(63) Continuation-in-part of application No. 13/507,141, filed on Jun. 7, 2012, now Pat. No. 8,961,916.

(51) Int. Cl.
  *B01D 53/14* (2006.01)
  *C01B 31/20* (2006.01)
  *E21B 43/16* (2006.01)
  *C02F 9/00* (2006.01)

(52) U.S. Cl.
  CPC .......... *B01D 53/1481* (2013.01); *C01B 31/20* (2013.01); *C02F 9/00* (2013.01); *E21B 43/164* (2013.01)

(58) Field of Classification Search
  None
  See application file for complete search history.

(56) References Cited

U.S. PATENT DOCUMENTS

| | | | |
|---|---|---|---|
| 4,002,565 A * | 1/1977 | Farrell | B01D 53/1418 210/750 |
| 6,365,051 B1 | 4/2002 | Bader | |
| 6,663,778 B1 | 12/2003 | Bader | |
| 7,093,663 B1 | 8/2006 | Bader | |
| 7,392,848 B1 | 7/2008 | Bader | |
| 7,789,159 B1 | 9/2010 | Bader | |
| 8,915,301 B1 | 12/2014 | Bader | |

(Continued)

OTHER PUBLICATIONS

Who. Desalination for Safe Water Supply. Guidance for the Health and Environmental Aspects Applicable to Desalination. Geneva 2007.*

(Continued)

*Primary Examiner* — Nina Bhat

(57) ABSTRACT

Oil wells at a certain stage of their production require Improved Oil Recovery (IOR) using a compatible and suitable saline fluid. To maintain production of such wells as they age further, IOR may advance to Enhanced Oil Recovery (EOR) using immiscible-$CO_2$, miscible-$CO_2$, and miscible $CO_2$-based Water-Alternating-Gas (WAG). This invention provides innovative methods to satisfy the need for IOR and EOR fluids in oil-fields by effectively de-scaling saline streams, recovering waste heat from flue gas, and de-sulfurizing flue gas. The methods are also useful for any power plants or combined heat and power (CHP) co-generation plants (e.g., power-seawater desalination co-generation plants) at sea locations using seawater for cooling and/or for producing drinking water. The inventive methods obviate a variety of operating, economic and environmental problems not only in oil-fields but also in power plants and CHP co-generation plants.

19 Claims, 9 Drawing Sheets

(56) References Cited

U.S. PATENT DOCUMENTS 8,961,916 B1 2/2015 Bader
2009/0260519 A1* 10/2009 Canari ................ B01D 53/507
    95/235

OTHER PUBLICATIONS

Savage, Sam. et al. Interactions between Chloride and SUlfate or Silica Removals Using an Advanced Lime-Aluminum Softening Process. Jan. 2007. Science.*

Lime Softening. Accessed from www.mrwa.com/Waterworksmnl/chaper%20166%20Lime%20Softening.pdf on Nov. 6, 2018. (Year: 2015).*

* cited by examiner (PRIOR ART)

METHODS FOR IMPROVING AND ENHANCING OIL RECOVERY

RELATED APPLICATION

This application is a continuation-in-part of U.S. patent application Ser. No. 13/507,141, filed Jun. 7, 2012, now U.S. Pat. No. 8,961,916, which is a continuation-in-part of U.S. patent application Ser. No. 12/592,801, filed Dec. 3, 2009, now U.S. Pat. No. 8,197,696.

This application is related to U.S. patent application Ser. No. 13/507,141, filed Jun. 7, 2012, now U.S. Pat. No. 8,961,916.

BACKGROUND OF THE INVENTION

The situation in north Kuwait oil-fields is used as an example to demonstrate the logic and the broad need for this practical invention. Similar situations may also take place in different parts of that country, in neighboring countries, and around the world. However, the invention is not restricted to use with such particular situations.

Mauddud is the largest reservoir in north Kuwait in terms of oil-in-place. It's a carbonate-based reservoir that extends over two oil-fields (Sabiriyah and Raudhatain). Improved Oil Recovery (IOR) for such fields by injecting seawater started in 2000. About 500,000 barrels per day (BPD) of seawater are currently injected. However, the location of the Seawater Treatment Plant (SWTP) and the way it is designed and operated attribute to inefficient performance along with a variety of oil wells' sulfate-related problems.

The future plan is to phase out seawater by 2020 and replace it with produced water as an IOR fluid. This may be due to the production of large amounts of produced water that ought to be managed. As such, a produced water treatment plant with a capacity of 950,000 BPD will be built. Nearly half of the plant's effluent water or more may be used for oil fields water injection operations (IOR) and the rest may be used for other applications and/or to be discharged off in disposal wells. The designed produced water treatment plant also forethoughts a different set of operating problems that will diminish its performance as well as impair oil wells.

To maintain oil production in Mauddud reservoir, the current and future IOR methods must be advanced to Enhanced Oil Recovery (EOR) methods. Several EOR methods were evaluated in bench and pilot setups. Miscible $CO_2$-based Water-Alternating-Gas (WAG) is one of the evaluated EOR methods that provided the most effective overall oil sweep. However, it was dismissed because the availability and proximity of $CO_2$ sources from the reservoir were perplexed at that time (2002), and the costs of conventional scrubbing methods and transferring $CO_2$ from its sources (south Kuwait) to the reservoir (north Kuwait) deemed high. The applicability of WAG thus hinged on the availability of saline water and $CO_2$ in sufficient quantities and acceptable qualities with the proximity of the reservoir.

The following presentation highlights the issues with the on-going seawater injection (IOR fluid), the projected produced water injection (IOR fluid) as well as the source and need of $CO_2$ as a viable EOR fluid.

Seawater Pre-Treatment Plant (SWTP)

FIG. 1 depicts the intricate issues associated with the location as well as the operation of SWTP (within the plant itself, transit line, and oil-fields that are subjected to seawater injection). The collective effects of these issues nullify the purpose of SWTP in terms of suspended solids and depleted oxygen, and impair oil wells in terms of sulfate-related problems.

Location of SWTP

The SWTP is located in the Subiya, which is a marshy area with a shallow seawater level located near the tip of the Arabian Gulf. Seawater therefore can not be drawn from a deep water column to take advantage of reduced oxygen, suspended solids and microbial activity at depth. The area is also known of having high silt since the Shatt Al-Arab river carries significant amounts of silt and discharges it into the tip of the Arabian Gulf. As such, seawater at Subiya area is very turbid with high silt index and suspended solids.

The improper SWTP location complexifies further by two circumstances. The first one is the impact of operating two nearby power-seawater desalination co-generation plants (Plant I completed in 2006 and Plant H completed in 2012). The implications of improper location along with the operation of such co-generation plants are pronounced in the rising levels of TDS and notorious scale-prone and toxic species, which are attributed to discharging back to the sea copious amounts of reject brine from the co-generation plants in conjunction with shallow seawater, not enough natural current, and the absence and/or insufficient mechanical brine dispersion devices. Table 1 reveals that sulfate concentration, for instance, has surged from 2,700 mg/L before fully operating the co-generation plants in 2006 to about 4,100 mg/L in 2013. The second circumstance is the on-going development in the adjacent Boubiyan Island (e.g., sand filling of a marshy area), which further stirs up turbidity and increases suspended solids in seawater.

Operation of SWTP

As depicted in FIG. 2, SWTP is based on simple processing steps: (1) disinfection with chlorine to preliminary eliminate biological growth; (2) addition of a coagulant to floc suspended solids; (3) filtration; (4) deoxygenation; and (5) addition of scale inhibitor, corrosion inhibitor, biocide, and oxygen scavenger to control, respectively, scale, corrosion, bacteria, and oxygen in the transit line and oil wells. The estimated operating cost is about $0.17 per barrel, and thus it costs about $31 million annually to operate it. Such a rough pre-treatment facility is expensive to operate in spite of its apparent simplicity.

Chlorine, as the primary biocide to kill seawater organisms, tends to be overdosed. Such an overdosing produces an undesirable excess of hypochlorous acid that attacks and corrodes the uncoated piping system, which would elevate the level of suspended solids. Chlorine dosing, a trivial procedure, never been optimized so that it will not be in excess of the amount needed to sanitize seawater.

Iron sulfate is improperly selected as a coagulant because it's the cheapest additive. This coagulant produces iron sludge (ferric hydroxide) in backwash water disposal ponds. The generated backwash water has the highest solids load compared to other types of coagulants and is difficult to dewater (thickens poorly). In addition, the plant is based on the "direct filtration" concept. This means that the three independent steps of flocculation (via coagulation), sedimentation, and filtration are combined nearly in one step and done within a very short residence time. The "direct filtration" concept is effective for high-quality raw water, not seawater with high silt index and suspended solids. The "direct filtration" of seawater is attempted by adding an excessive amount of the coagulant, far in excess of the amount needed to neutralize charges on suspended particles, so that most of the suspended particles can be swept from the bulk of seawater by becoming enmeshed in the precipitating "ferric hydroxide" floc.

The problems with this "sweep floc" approach are: (1) the adverse effect on the permeability of filtration media, and thus more frequent backwash; (2) generation of excessive amounts of sludge with high solids load (ferric hydroxide) in backwash disposal ponds; and (3) escape of a significant amount of un-reacted iron sulfate from the filters to effluent seawater, which with the aid of deoxygenation (a step conducted after the filtration step) precipitates as iron sulfide (pyrite). This raises the total suspended solids (TSS) again after the completion of filtration, which rescinds two of the primarily purposes of SWTP of controlling TSS and particle size distributions (PSD).

Further oxygen depletion oxygen from the pre-treated seawater is also important since 1 ppb of dissolved oxygen produces theoretically about 80 kg of rust per year. Sodium bisulfite is used as an oxygen scavenger. However, sodium bisulfite decomposes to highly corrosive by-products (sulfur dioxide and hydrogen sulfide) at high pressures. Thus, it should not be used since the pre-treated seawater must be pumped from the plant at high pressure via a pumping station to the oil fields. Hydrazine, on the other hand, would be a more appropriate oxygen scavenger since it decomposes into ammonia, which increases the pH and acts as a protector against corrosion.

Transit Line

The transit line that connects SWTP to oil-fields is a 29 miles uncoated carbon steel pipeline. Excess hypochlorous acid due to chlorine overdosing has a significant impact on corroding transit line. The high-pressure transfer pumps also re-introduce oxygen to the pre-treated seawater (after oxygen is depleted mechanically and chemically). Escaped iron derivatives (due to overdosing of an inappropriate coagulant) and the corrosive by-products of the decomposed sodium bisulfite accelerate corrosion in transit line. As such, the high-pressure transfer pumps and transit line compromise further the rough quality of pre-treated seawater in terms of TSS, PSD, and oxygen (the three targeted parameters), which virtually nullifies SWTP.

The mechanism of a corrosion attack on metal structures in saline water is electrochemical. For a corroding metal structure (e.g., pipeline), electric currents can be detected entering or leaving with the flowing saline water at local sites (corrosion cells). Each local corrosion cell has a local anode and a local cathode. Metallic ions in the saline water (e.g., iron) tend to deposit at the local anode of the corrosion cell, while hydrogen ions tend to deposit at the local cathode of the corrosion cell. Factors within the flowing saline water such as pH, dissolved gases, bacterial growth, salt content, and temperature can either restrict or accelerate corrosion cells in metal structures.

The degree of corrosive attack on metal structures is mainly controlled by the amount of oxygen that diffuses to the cathode. Oxygen will remove the deposit of hydrogen at the local cathodes by forming water. Once pressure is applied to pre-treated seawater in the transit line, large amounts of oxygen are re-introduced via transfer pumps. In flowing seawater, the cathodic areas receive an ample supply of oxygen, and the local corrosion cells accelerate. In addition, oxygen oxidizes the naturally existing as well as the induced ferrous ions (soluble) in seawater to ferric ions (insoluble). The generated ferric ions would attack fresh metal surfaces (initiate new corrosion cells).

In addition to pyrite precipitation, iron oxide (hematite) precipitation also takes place as a result of the high-pressure transfer pumps that re-introduce oxygen to the pre-treated seawater. Finely dispersed iron precipitates (pyrite and hematite) are very critical since the attractive forces between them are considerably less than the repelling forces of their electric charges. Thus, they are nearly immune to any traditional coagulation-flocculation steps, and therefore exceptionally difficult to remove by conventional filtration methods. As such, a second filtration setup is added at the oil wells injection platform (at the end of the 29 miles transit line) to remove finely dispersed iron derivatives and corrosion debris. However, the second filtration setup is either constantly maintained to cope with the overwhelming iron fine precipitates or by-passed. The re-introduced oxygen to pre-treated seawater is also left without further depletion at the injection platform by relying only on an inappropriate oxygen scavenger.

Leaving such dispersed iron precipitates in pre-treated seawater without removal or further dispersion or sufficient stabilization before injection causes pumps degradation and plugging of injection wells' pore throats. The resultant decline in permeability can severely impair injection wells. Even acid treatment has a limited effect in reversing pore throats plugging with such fine precipitates.

The lump sum effects of overdosing chlorine, inappropriate coagulant, inappropriate oxygen scavenger, re-introducing oxygen via transfer pumps, uncoated transit line, along with the natural existence of a very small concentration of uranium (5 μg/L) in seawater will also introduce the problem of "Technologically Enhanced Naturally Occurring Radioactive Materials" (TE-NORM). The TE-NORM problem may not be noticed at this time but eventually will take place. TE-NORM are increasingly becoming an environmental issue, particularly in aging seawater pre-treatment facilities.

In a documented case, an aged pre-treated seawater transit line that is initially bare 5 μg/L of the uranium is significantly elevated to about 16,000 mg/L. Such a high uranium concentration found in precipitated solids in corroded pipelines exceeds the permissible limit of 150 pico-Curies per gram. Ponds that hold blow down from cleaning pipelines of precipitating debris or the decommissioning of scraped pipelines represent radioactive hazards; a similar situation experienced a few years ago in a neighboring country.

Subjected Oil-Fields to Seawater Injection

Aside from the unresolved issues (TSS, PSD, and oxygen) that SWTP is presumably designed to control is the presence of sulfate in seawater. Sulfate causes enormous operational problems in oil-fields. As shown in Table 1, seawater from the Subiya location contains an appreciable concentration of sulfate whereas oil wells formation water consistently contains excessive concentrations of calcium and strontium along with small concentration of barium and possibly radium. Injection of seawater without the selective removal of sulfate would generate: (1) sulfate scale deposits in the forms of sparingly soluble alkaline cations (calcium, strontium, barium, and radium) from injection to producing wells along with the possible attachment of "Naturally Occurring Radioactive Materials" (NORM) to such sulfate scale deposits; and (2) hydrogen sulfide. FIG. 3 summarizes these sulfate problems; what I coined the "sulfate valley of death".

Sulfate scale deposits are hard, adherent, almost insoluble in mineral acids or other common solvents, and difficult to remove mechanically. Hence, such deposits could cause severe flow restrictions within the drainage radius inside formation, within the wellbore, and in processing and surface equipment. The visible part of the notorious sulfate scale damages, which is manageable to some degree, can be seen within the operating equipment and surface processing facilities (e.g., stuck downhole pumps, plugged perforations and tubing strings, choked flow lines, frozen valves, etc.). However, the accumulation of sulfate scale deposits within the invisible oil-bearing formation could bare the ultimate damage.

In spite of a large number of proprietary chemical blends that are available as scale inhibitors and dissolvers, sulfate scale prevention or remediation with such chemicals has proved difficult, very expensive, and of limiting value for solving the scale problem or protecting reservoirs formation. Once sulfate scale is encountered beyond the mitigation ability of any types of chemical treatment in a given field, mechanical de-scaling is the common remedy. However, mechanical treatment is very expensive (e.g., wells shutdown, removal of processing equipment, etc.) and limited to the removal of scale within the reachable range of the de-scaling equipment.

Injection of seawater is also associated with the souring of oil wells due to microbial production of hydrogen sulfide. Hydrogen sulfide is a toxic and corrosive gas responsible for a variety of problems including reservoir souring, contamination of hydrocarbons, corrosion of metal surfaces, and the plugging of reservoirs due to the precipitation of metal (e.g., iron) sulfides and the consequent reduction in oil recovery. Seawater injection is a major source of sulfide as a result of the metabolic activities of sulfate reducing bacteria. Such bacteria reduce sulfate to sulfide coupled to the oxidation of hydrogen and a wide variety of organic electron donors. Since oil wells are rarely limited in the supply of potential electron donors, the activity of sulfate reducing bacteria may be limited by the availability of electron acceptors. If sulfate is available, accumulation of sulfides is inevitable.

Uranium (U-238 and U-235) and thorium (Th-232) are present in the earth's crust as immobile species, whereas their γ-emitting daughter nuclides, radium and its isotopes, can be transported with formation water. Once radium isotopes are leached from their lithological origin, they are no longer supported by their ancestors. Thus, they develop their own decay series (NORM). FIG. 4 depicts the decay chain of radium.

Radium and its isotopes tend to co-precipitate with other sparingly soluble alkaline cations in the forms of sulfate, and thus oil-fields produced water could become radioactive. As such, external (near any processing equipment), and internal (during maintenance or workovers) radioactive hazards could exist due to NORM adherent to sulfate scale buildups. About 40 wells are currently plugged with radioactive sulfate scale deposits as a result of injecting sulfate-rich seawater. Expensive workovers are projected to de-plug and de-contaminate such wells, let alone deferred oil production as well as not meeting oil production quota and the new stringent environmental law that prohibits generating and storing radioactive waste.

Replacing Seawater with Produced Water by 2020

Unlike seawater (a near uniform stream in terms of constituents except seasonal temperatures and algae bloom), oil-fields produced waters are variable streams. There are not any produced waters alike. Produced water contains four main groups of constituents: (1) associated acid gases; (2) organics (oil content); (3) inorganics; and (4) additives (scale and corrosion inhibitors, anti-foam agents, emulsifying and demulsifying agents, etc.). Produced water treatment is typically centered on partial removal of entrained oil with suspended solids.

A produced water treatment plant will be built between the Sabiriyah and Raudhatain oil-fields. The treated produced water is projected to be used as an IOR fluid in such fields by 2020. The idealistic targeted parameters for treating produced water are set as follows: (1)<10 ppm of TSS (98% of particle size <2 microns); (2)<10 ppm of oil content; and (3)<10 ppb of oxygen content. However, produced water contains high contents of iron sulfides (100-300 ppm) and oil (250-2,500 ppm). The high content of iron sulfides is largely attributed to the injection of rough sulfate-rich seawater over the past 14 years.

In oil industry, producers tend to follow a so-called "application drift" where specifications from one project "drift" into another. The same goes for instrumentation where instruments designed for one kind of measurement "drift" into another. An instrument designed to PSD, for example, "drifted" to measure entrained oil droplets with suspended solids.

Thus, partial de-oiling of produced water is conventionally targeted by two or three steps based on the size of entrained oil droplets. Sludge catchers (e.g., skimmers or any other basic oil separation equipment along with coalescer) are used as a first de-oiling step to primarily separate the bulk of dispersed oil droplets (>100 μm). Corrugated plate separators, hydrocyclones, centrifuges, electrostatic dehydrators, induced gas flotation without chemical addition, or a combination is typically used in a second de-oiling step to remove smaller dispersed oil droplets (15-100 μm). Induced gas flotation with chemical addition, adsorption (e.g., activated carbon, nutshell, etc.), filtration (e.g., ultrafiltration), extraction (liquids or supercritical fluids or polymers), or a combination is frequently (but not always) used in a final polishing step to remove finer oil droplets (5-15 μm).

However, crude oil contains a large number (hundreds) of hydrocarbons, many of which are structurally undetermined or difficult to identify. Oil content measurement, even though it's a primitive lump sum blind parameter, is the method to determine total oil in produced water. It consists of three portions: (1) dispersed (free or floating) insoluble oil droplets; (2) dissolved non-polar hydrocarbons (species that are strictly composed of hydrogen-carbon chains and known as Total Petroleum Hydrocarbons or TPH); and (3) dissolved organic non-hydrocarbons that consist of mainly oxygen-containing species and known as carboxylic or fatty or naphthenic acids. Yet, measurements of oil content in oil-fields are mostly based on the "non-dispersive infrared measurements" and thus they are limited to the quantifications of TPH. Thus, the dispersed oil and carboxylic acids portions are not included in most reported oil content.

None of the above mentioned conventional de-oiling steps, individually or collectively, are capable of efficiently removing dissolved oily species and carboxylic acids and thus a significant portion of actual oil content remains in the treated produced water as scale/emulsion contributors. Such conventional de-oiling steps are also not Zero-Liquid-Discharge (ZLD) since they produce oily concentrate waste (e.g., skimmers and ultrafiltration) or exhausted oily materials (e.g., nutshell) that require proper disposal path and/or further treatment (e.g., disposal wells, incineration, landfills, etc.).

"Application drift" appears to be the basis of the projected produced water treatment plant, which is similar to two built plants in south Kuwait. The projected plant consists of two main processing steps: (1) collected produced water from gathering centers and tank farms is diverted to balance tanks, which are blanketed with fuel gas or nitrogen to presumably avoid oxygen ingression and equipped with oil skimmers and smokeless flare units; and (2) nutshell filters to polish the oil skimmed produced water from balanced tanks. About one billion dollars budget is allocated for building such a primitive plant.

Nutshell is an effective inexpensive filtration method (high affinity for dispersed oil droplets and elasticity for backwash) only when deployed properly. However, the projected produced water treatment plant is very expensive and yet it truncates the three conventional de-oiling steps into two (oil skimmers and nutshell filters). Oil is adsorbed on the shell surface and the shell surface is regenerated by backwashing. There is a fine distinction between adsorption and absorption; the nutshell loosely adsorbs, not absorbs dispersed oil, so dispersed oil is loosely held. If properly sized, nutshell filter will remove most of dispersed oil but is much less effective in removing dissolved oil, volatile hydrocarbons, and carboxylic acids. Sizing tremendously affects performance, but if it's inappropriate, the shell contact surface area is not in direct contact with the dispersed oil droplets and they elope around the shell media to the effluent stream.

In addition, dispersed oil in the form of emulsions or inverted emulsions will be difficult to remove with a nutshell filter. Pre-treatment with an emulsion breaker may seem useful but the emulsion breaker would affect the adsorptive capacity of the nutshell surface. Using coagulants and/or polymers to create floc in front of the nutshell filter may also seem helpful, but the coagulant could reduce the surface charge of colloids and emulsions, which would make adsorption difficult.

When produced water comprises of oil wet iron sulfides, which is the case here, it overloads the nutshell filter with suspended solids and reduces its ability to even adsorb dispersed oil. Reducing filter's pore size to less than 1 micon (PSD "drift" approach for entrained oil with iron sulfides) may produce the required water quality in terms of suspended solids. However, it would come at enormous maintenance and operating costs due to iron sulfides plugging and fouling of media resulting in more backwash cycles, less effective backwash, labor intensiveness, and high waste.

It is worth noting that iron sulfides plugging and fouling were clearly pronounced, experienced, and documented with the two previously built produced water treatment plants, but "experience drift" was not applied to avoid falling into a new "application drift" trap of building a third identical produced water treatment plant. The simple fact is that nutshell can not tolerate iron sulfides (suspended solids), and thus it will not tolerate entrained oil either. Oil wet iron sulfides produced water requires an iron precipitation or oxidizing mechanism and an effective de-oiling more than nutshell filtration or its pore size and porosity to enable actual removal of oil and suspended solids to the set levels.

Aside from the intricacy of oil wet iron sulfides, it's the far more critical content of alkaline cations (calcium, strontium and barium) since may be at least half, if not more, of the treated produced water will be used as an IOR for Sabiriyah and Raudhatain oil fields by 2020. Produced water will then replace 20 years of injecting sulfate-rich seawater into such oil wells. About 215,000 tons of sulfate were introduced into such wells in the past 14 years (2000-2014), and about 135,000 tons of sulfate will be introduced into such wells in the next 6 years (2015-2010). The total wells' intake of sulfate by 2020 will be about 350,000 tons.

The projected produced water treatment plant does not remove the content of alkaline cations. Once produced water is used as an IOR for Sabiriyah and Raudhatain oil fields in 2020, oil wells' intake of calcium will be 134,000 tons in the first year and 402,000 tons in the third year. At high downhole temperatures, deposits of calcium sulfate (anhydrous and hemihydrates) along with strontium and barium sulfates will be overwhelming (enormous sulfate scale, if not radioactive sulfate scale, plugging).

Properly managing the copious amounts of produced water is a must, but must neither imply further oil wells damaging nor enormous expenditures. If produced water ought to be used as an IOR, then the plan of building an ineffective produced water treatment plant at a cost of over one billion dollars, which is an extraordinarily inverse ratio of investment returned on money invested, must be revised and a change of direction must take place.

Nearby Power-Seawater Desalination Co-Generation Plants

The first power-seawater desalination co-generation plant in north Kuwait was completed in 2006 and the second one was completed in 2012. Both co-generation plants produce about 5.6 million BPD of water distillate and 5,100-5,425 megawatts (MW). As shown in FIG. 1, however, the desalination plants suffer from nearly the same issues as the SWTP, which hinder their productivities. As such, they reject about 12 million BPD of sulfate-infested brine. The plants' power outputs constitute about one-third of the total installed power in Kuwait that was not available 2-8 years ago. The plants emit daily about 1.5 billion SCF of $CO_2$, which is an enormous $CO_2$ source for north Kuwait oil fields EOR once its captured and liberated from $SO_2$ in a cost effective manner.

SWTP and power-seawater desalination co-generation plants are adjacent to each other, sharing the same seawater intake infrastructures. Oil-fields not only need IOR using suitable saline water injection but also need EOR (e.g., $CO_2$ or $CO_2$-based WAG) in the near future to at least maintain the current oil production rate. The current IOR of injecting seawater is rescinded by the poor quality of SWTP, transit line, and sulfate-related problems in oil-fields. The sulfate problems, after 14 years of injecting sulfate-rich seawater, are on the threshold of widely spreading across oil-fields. On the other hand, $CO_2$-related EOR methods were dismissed in 2002, even though there are needed, due to outdated high cost estimates for scrubbing and transferring $CO_2$ from south to north Kuwait.

The Objectives of this Invention

The objective of this invention is to avert and convert environmental liabilities and economic losses to useful by-products using innovative de-scaling and de-sulfurizing methods. De-scaling is aimed at recovering alkaline cations and sulfate from seawater and the like of saline stream as salable by-products and producing de-scaled seawater to be used as a suitable IOR fluid in oil-fields. A further benefit of de-scaling in this invention is that a slip stream (1-2%) of the de-scaled seawater can be used as a de-sulfurizing fluid to absorb $SO_2$ from flue gas and to liberate $CO_2$ to be used as an EOR fluid for oil-fields as well as other applications (e.g., food processing, urea production and carbonation of brine to precipitate sodium bicarbonate for soda ash production). As a result of de-scaling, the design of flue gas de-sulfurization is simplified using a small size scrubber with flexibility, flue gas waste heat recovery, no waste disposal, and about 50% lower capital and operating costs than required for most conventional flue gas de-sulfurization systems. The de-scaling process thus carries not only its internal losses (by providing salable inorganic by-products in addition to de-scaled saline water), but also some of the losses in the power plants or combined heat and power (CHP) co-generation plants (e.g., power-seawater desalination) in terms of flue gas which exists in boilers' inefficiency, wasted thermal energy, and air pollution.

SUMMARY OF THE INVENTION

In one aspect, the present invention provides a method for separating brucite and sulfate from saline feed stream to produce de-scaled saline stream; and for scrubbing flue gas using indirect-contact heat condensing scrubber to absorb sulfur dioxide, recover waste heat and liberate carbon dioxide. The inventive method comprises the steps of: (a) separating brucite from the saline feed stream to produce de-brucited saline stream; (b) separating sulfate from the de-brucited saline stream to produce de-scaled saline stream; (c) stripping the de-scaled saline stream by a vapor-liquid equilibrium based unit to produce a stripped saline stream; (d) injecting the stripped saline stream into oil wells for improving oil recovery or for other applications; (e) contacting a portion of the stripped saline stream with flue gas in the indirect-contact heat condensing scrubber to condense flue gas, absorb sulfur dioxide from flue gas, liberate carbon dioxide, and heat make-up water by exchanging heat with the condensed flue gas for other process heating applications; (f) using the liberated carbon dioxide in oil wells for enhancing oil recovery or for other applications; (g) filtering the spent saline stream from the scrubber and recycling the filtered spent saline stream to the saline feed stream; or (h) re-circulating the stripped saline stream through the scrubber, bleeding a portion of the re-circulated stripped saline stream, and adding a sufficient amount of the stripped saline stream to the re-circulated stripped saline stream to substitute the bled portion. Brucite is separated from the saline feed stream in step (a) by: (i) mixing the saline feed stream with an amount of a hydroxide source to form precipitates comprising brucite in a first precipitator unit; and (ii) removing precipitates from the saline feed stream by an appropriate filtration unit to produce de-brucited saline stream and dewatered precipitates. Sulfate is separated from the de-brucited saline stream in step (b) by: (i) mixing the de-brucited saline stream with an amount of an aluminum-based or iron-based additive, and an amount of a hydroxide source to form precipitates comprising calcium sulfoaluminate or calcium sulfoferrate in a second precipitator unit; and (ii) removing precipitates from the de-brucited saline stream by an appropriate filtration unit to produce the de-scaled saline stream and dewatered precipitates. Saline feed stream is seawater, brine from seawater desalination plants, natural brine, brackish water, produced water, hydro-fracturing flow-back water, conventional flue gas desulphurization spent water, agricultural drainage water, acid mine drainage water, mineral slurry transport water, paper mills spent water, aluminum anodizing spent water, spent water from fertilizer production, lime slaking, or spent water from textile production. The hydroxide source is selected from the group consisting of calcium chloroaluminate, calcium chloroferrrate, lime, hydrated lime, ammonia, methylamine, ethylamine, isopropylamine, propylamine, dimethylamine, diethylamine, diisopropylamine, dipropylamine, or a combination thereof. The aluminum-based additive is selected from the group consisting of calcium chloroaluminate, aluminum chlorohydrate, calcium aluminate, sodium aluminate, aluminum acetate, aluminum chloride, and aluminum nitrate. The iron-based additive is selected from the group consisting of calcium chloroferrate, calcium ferrate, sodium ferrate, iron chloride, and iron nitrate.

In yet another aspect, the present invention provides a method for separating brucite and sulfate from saline feed stream to produce de-scaled saline stream; and for scrubbing flue gas using direct-contact heat exchanger and scrubber to recover waste heat, absorb sulfur dioxide and liberate carbon dioxide. The inventive method comprises the steps of: (a) separating brucite from the saline feed stream to produce de-brucited saline stream; (b) separating sulfate from the de-brucited saline stream to produce de-scaled saline stream; (c) stripping the de-scaled saline stream by a vapor-liquid equilibrium based unit to produce stripped saline stream; (d) injecting the stripped saline stream into oil wells for improving oil recovery or for other applications; (e) contacting flue gas with make-up water in the direct-contact heat exchanger to condense flue gas and directly heat the make-up water by exchanging heat with the condensed flue gas for other process heating applications; (f) contacting a portion of the stripped saline stream with the condensed flue gas in the scrubber to absorb sulfur dioxide and liberate carbon dioxide; (g) using the liberated carbon dioxide in oil wells for enhancing oil recovery or for other applications; (h) filtering the spent saline stream from the scrubber and recycling the filtered spent saline stream to the saline feed stream; or (i) re-circulating the stripped saline stream through the scrubber, bleeding a portion of the re-circulated stripped saline stream, and adding a sufficient amount of the stripped saline stream to the re-circulated stripped saline stream to substitute the bled portion.

In yet another aspect, the present invention provides a method for separating brucite and sulfate from saline feed stream to produce de-scaled saline stream; and for scrubbing flue gas using heat pipe exchanger and scrubber to quench flue gas, absorb sulfur dioxide and liberate carbon dioxide. The inventive method comprises the steps of: (a) separating brucite from the saline feed stream to produce de-brucited saline stream; (b) separating sulfate from the de-brucited saline stream to produce de-scaled saline stream; (c) stripping the de-scaled saline stream by a vapor-liquid equilibrium based unit to produce stripped saline stream; (d) injecting the stripped saline stream into oil wells for improving oil recovery or for other applications; (e) exchanging the waste of flue gas with carbon dioxide existing the scrubber in the heat pipe to quench flue gas before entering the scrubber and heat carbon dioxide existing the scrubber; (f) contacting a portion of the stripped saline stream with the quenched flue gas in the scrubber to absorb sulfur dioxide and liberate carbon dioxide; (g) using the liberated carbon dioxide in oil wells for enhancing oil recovery or for other applications; (h) filtering the spent saline stream from the scrubber and recycling the filtered spent saline stream to the saline feed stream; or (i) re-circulating the stripped saline stream through the scrubber, bleeding a portion of the re-circulated stripped saline stream, and adding a sufficient amount of the stripped saline stream to the re-circulated stripped saline stream to substitute the bled portion.

In yet another aspect, the present invention provides a method for separating sulfate from saline feed stream to produce de-scaled saline stream; and for scrubbing flue gas using indirect-contact heat condensing scrubber to absorb sulfur dioxide, recover waste heat and liberate carbon dioxide. The inventive method comprises the steps of: (a)

separating sulfate from the saline feed stream to produce de-scaled saline stream; (b) stripping the de-scaled saline stream by a vapor-liquid equilibrium based unit to produce stripped saline stream; (c) injecting the stripped saline stream into oil wells for improving oil recovery or other applications; (d) contacting a portion of the stripped saline stream with flue gas in the indirect-contact heat condensing scrubber to condense flue gas, absorb sulfur dioxide, liberate carbon dioxide, and heat make-up water by exchanging heat with the condensed flue gas for other process heating applications; (e) using the liberated carbon dioxide in oil wells for enhancing oil recovery or for other applications; (0 filtering the spent saline stream from the scrubber and recycling the filtered spent saline stream to the saline feed stream; or (g) re-circulating the stripped saline stream through the scrubber, bleeding a portion of the re-circulated stripped saline stream, and adding a sufficient amount of the stripped saline stream to the re-circulated stripped saline stream to substitute the bled portion. Sulfate is separated from the saline feed stream in step (a) by: (i) mixing the saline feed stream with an amount of an aluminum-based or iron-based additive and an amount of a hydroxide source to form precipitates comprising magnesium-calcium sulfoaluminate or magnesium-calcium sulfoferrate in a precipitator unit; and (ii) removing precipitates from the saline feed stream by an appropriate filtration unit to produce the de-scaled saline stream and dewatered precipitates. The hydroxide source is selected from the group consisting of aluminum hydroxide, iron hydroxide, magnesium hydroxide, magnesium oxide, ammonia, methylamine, ethylamine, isopropylamine, propylamine, dimethylamine, diethylamine, diisopropylamine, and dipropylamine, or a combination thereof. The aluminum-based additive is selected from the group consisting of aluminum hydroxide, aluminum chlorohydrate, sodium aluminate, aluminum acetate, aluminum chloride, and aluminum nitrate. The iron-based additive is selected from the group consisting of iron hydroxide, sodium ferrate, iron chloride, and iron nitrate.

In yet another aspect, the present invention provides a method for separating sulfate from saline feed stream to produce de-scaled saline stream; and for scrubbing flue gas using direct-contact heat exchanger and scrubber to recover waste heat, absorb sulfur dioxide and liberate carbon dioxide. The inventive method comprises the steps of: (a) separating sulfate from the saline feed stream to produce de-scaled saline stream; (b) stripping the de-scaled saline stream by a vapor-liquid equilibrium based unit to produce stripped saline stream; (c) injecting the stripped saline stream into oil wells for improving oil recovery or other applications; (d) contacting flue gas with make-up water in the direct-contact heat exchanger to condense flue gas and directly heat the make-up water by exchanging heat with the condensed flue gas for other process heating applications; (e) contacting a portion of the stripped saline stream with the condensed flue gas in the scrubber to absorb sulfur dioxide and liberate carbon dioxide; (f) using the liberated carbon dioxide in oil wells for enhancing oil recovery or for other applications; (g) filtering the spent saline stream from the scrubber and recycling the filtered spent saline stream to the saline feed stream; or (h) re-circulating the stripped saline stream through the scrubber, bleeding a portion of the re-circulated stripped saline stream, and adding a sufficient amount of the stripped saline stream to the re-circulated stripped saline stream to substitute the bled portion.

In yet another aspect, the present invention provides a method for separating sulfate from saline feed stream to produce de-scaled saline stream; and for scrubbing flue gas using heat pipe exchanger and scrubber to quench flue gas, absorb sulfur dioxide and liberate carbon dioxide. The inventive method comprises the steps of: (a) separating sulfate from the saline feed stream to produce de-scaled saline stream; (b) stripping the de-scaled saline stream by a vapor-liquid equilibrium based unit to produce stripped saline stream; (c) injecting the stripped saline stream into oil wells for improving oil recovery or for other applications; (d) exchanging the waste of flue gas with carbon dioxide existing the scrubber in the heat pipe to quench flue gas before entering the scrubber and heat carbon dioxide existing the scrubber; (e) contacting a portion of the stripped saline stream with the quenched flue gas in the scrubber to absorb sulfur dioxide and liberate carbon dioxide; (f) using the liberated carbon dioxide in oil wells for enhancing oil recovery or for other applications; (g) filtering the spent saline stream from the scrubber and recycling the filtered spent saline stream to the saline feed stream; or (h) re-circulating the stripped saline stream through the scrubber, bleeding a portion of the re-circulated stripped saline stream, and adding a sufficient amount of the stripped saline stream to the re-circulated stripped saline stream to substitute the bled portion.

This invention is not restricted to use in connection with one particular application. This invention can generally be used for de-scaling saline water to produce useful and salable salts, de-scaled saline stream, and flue gas scrubbing fluid. Further objects, novel features, and advantages of the present invention will be apparent to those skilled in the art upon examining the accompanying drawings and upon reading the following description of the preferred embodiments, or may be learned by practice of the invention.

DESCRIPTION OF THE PREFERRED EMBODIMENT

The Precipitation Concept

Figure 1:
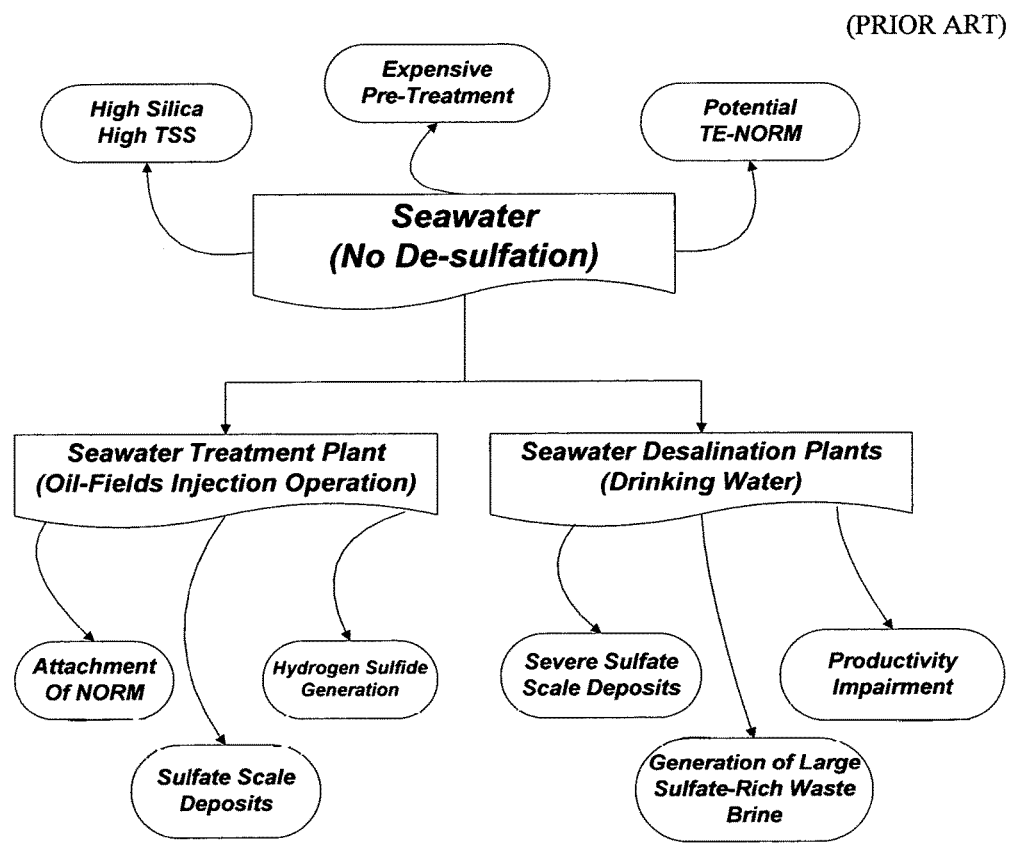
FIG. 1 illustrates the shared technical issues between SWTP and the nearby power-seawater desalination co-generation plants (Bader, U.S. Pat. No. 7,789,159).
Figure 2:
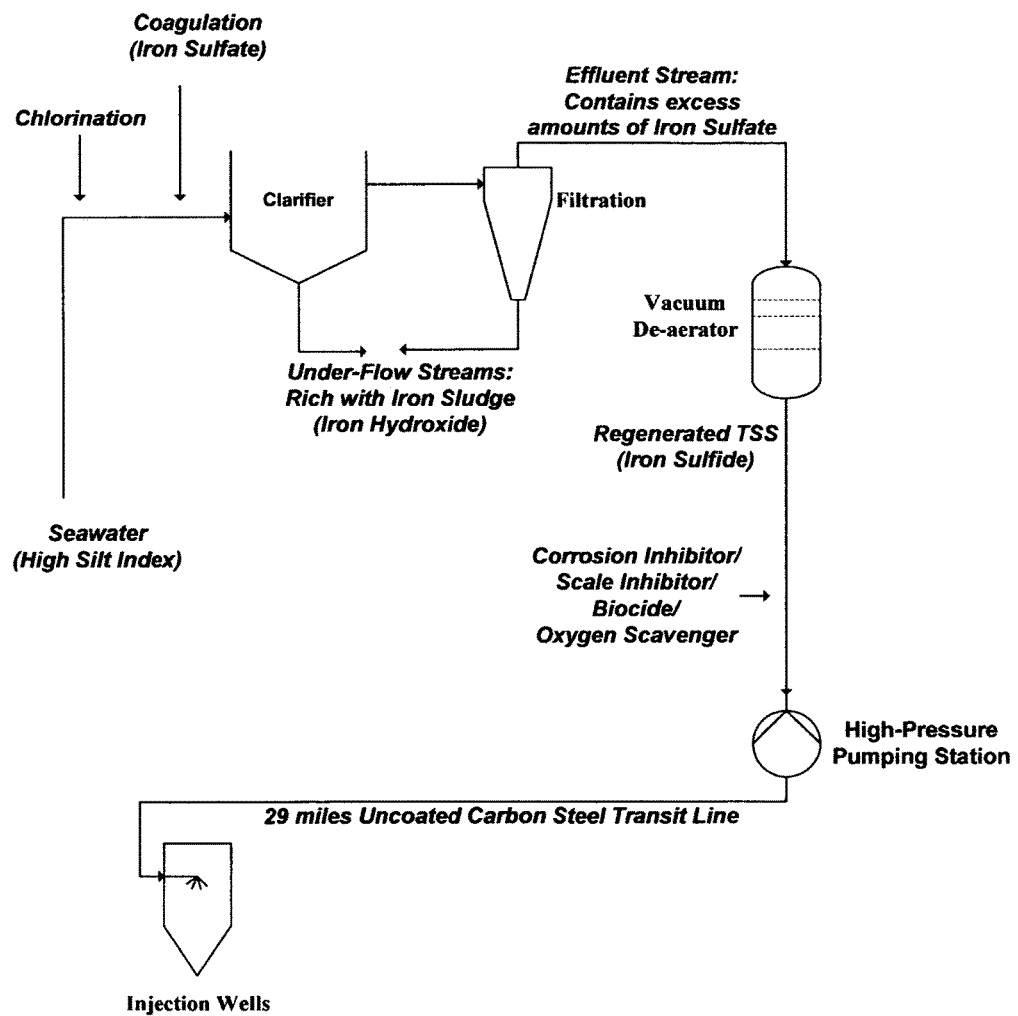
FIG. 2 illustrates a simplified flow diagram for SWTP.
Figure 3:
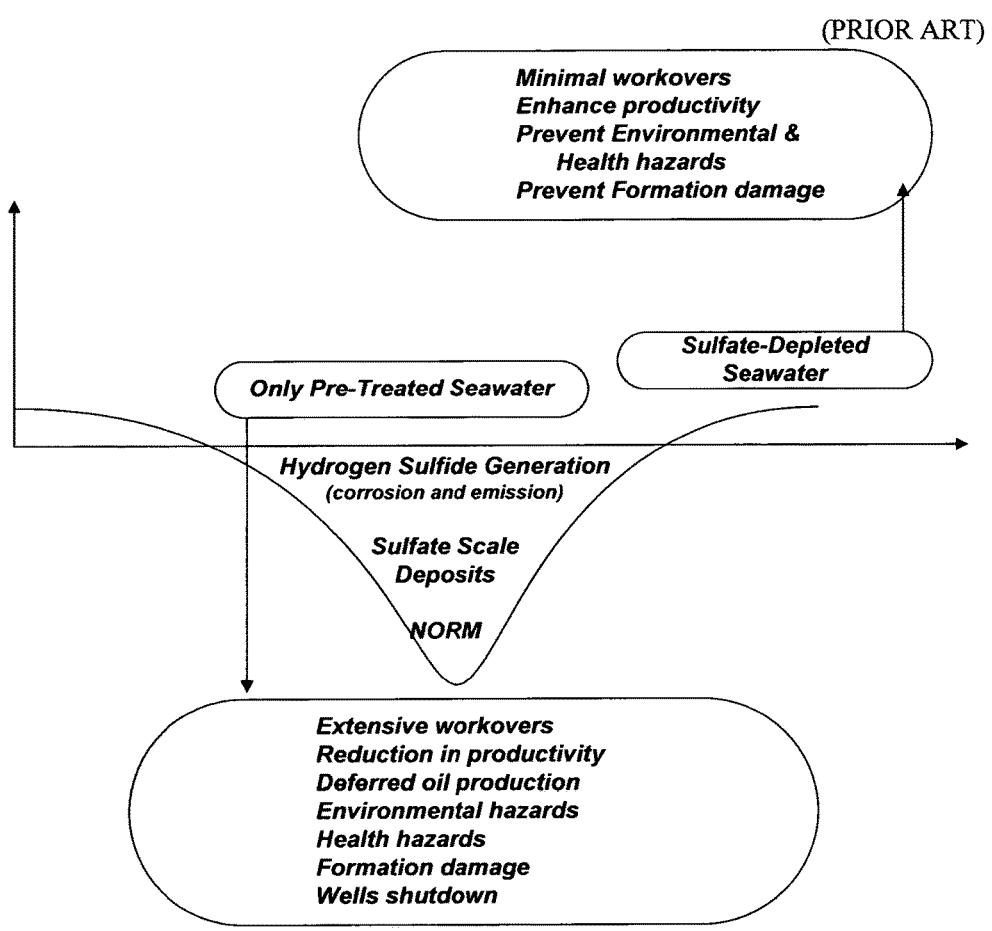
FIG. 3 illustrates sulfate-related problems in oil-fields (Bader, U.S. Pat. No. 7,789,159).
Figure 4:
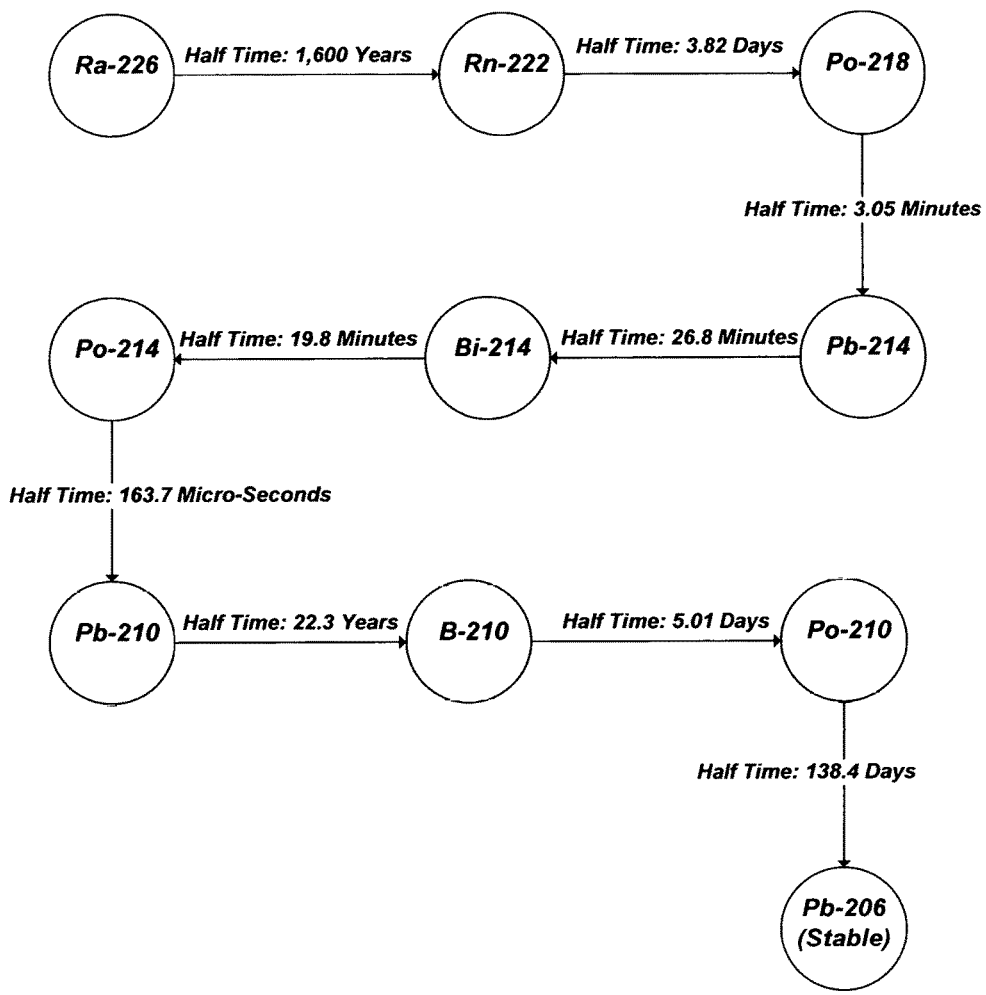
FIG. 4 illustrates the decay chain of radium (NORM) (Bader, U.S. Pat. No. 7,963,338).

I have previously invented the Liquid-Phase Precipitation process (LPP) for the separation of inorganic species from saline streams. The effect of the separation in LPP is to intermix a saline stream with a suitable solvent at ambient temperature and atmospheric pressure to form selective precipitates. The suitable solvents are those which have the capability to meet two basic criteria.

The first criteria is the suitability to precipitate targeted inorganic species from saline streams. The selected organic solvent must be miscible or at least soluble in water. Of equal importance, the targeted inorganic species must be sparingly soluble in the organic solvent. The addition of such a solvent to a saline stream leads to the capture of part of the water molecules and reduces the solubility of inorganic species in the water which form insoluble precipitates. The solubility of the targeted inorganic species in the organic solvent is a critical factor in achieving the degree of saturation. Solubility related factors such as ionic charge, ionic radius, and the presence of a suitable anion in the saline stream play important roles in affecting and characterizing precipitates formation.

The second criteria is suitability for overall process design. For ease of recovery, the selected solvent must have favorable physical properties such as low boiling point, high vapor pressure, high relative volatility, and no azeotrope formation with water. From a process design standpoint, the selected solvent must have relatively low toxicity since traces of the organic solvent always remain in the discharge stream. Further, the selected solvent must be chemically stable, compatible with the process, and relatively inexpensive.

The energy required to thermally separate the solvent from the aqueous mixture after precipitating the targeted inorganic species generally depends on the solvent's boiling point. For distillation purposes, solvent's boiling point determines the number of degrees to which the mixture must be heated. However, the solvent's specific heat and heat of vaporization are also critical. The specific heat of the solvent determines the number of calories that must be introduced into the mixture to raise it each degree whereas the heat of vaporization determines the number of additional calories needed to vaporize the solvent. As such, the smaller the solvent's specific heat and heat of vaporization, the fewer calories required for its thermal recovery.

Low boiling point solvents are thus preferred because the less difference between the mixture temperature and the solvent's boiling temperature, the fewer calories required for thermally separating the solvent from the mixture. In addition, with higher boiling point solvents, less complete solvents thermal recovery since the recovered solvents carry significant amounts of water. Carried over water, with its high heat of vaporization, represents an energy penalty.

Several amine solvents have been identified for potential use in the LPP process. The selected solvents, which are derivatives of ammonia, are primary and secondary amines. They include methylamine (MA), ethylamine (EA), isopropylamine (IPA), propylamine (PA), dimethylamine (DMA), diethylamine (DEA), diisopropylamine (DIPA), and dipropylamine (DPA).

Nitrogen can form compounds with only three covalent bonds to other atoms. An ammonia molecule contains $sp^3$-hybridized nitrogen atom bonded to three hydrogen atoms. On the other hand, an amine molecule contains $sp^3$-hybridized nitrogen atom bonded to one carbon atom (primary amines) or more carbon atoms (2 carbon atoms in the case of secondary amines). The nitrogen has one orbital filled with a pair of unshared valence electrons, which allows these solvents to act as bases. Ammonia and the selected amines are therefore weak bases that could undergo reversible reactions with water or other weak acids. However, when such solvents react with a strong acid, their unshared electrons are used to form sigma bond with the acid, which drives the reaction to completion (irreversibly).

Table 2 presents some of the important characteristics of the selected solvents. However, IPA is the preferred solvent in the LPP process. The preference of using IPA is attributed to its high precipitation ability with different basic salts, overall favorable properties, near complete reaction with strong acids, and relatively minimal environmental risks.

Improving the performance of LPP is always a target. One of the essential improvements is to minimize, if not eliminate, the use of the amine solvent. Inorganic additives can alternatively replace organic additives or can be used in addition to organic additives to induce precipitation of targeted species. The suitable inorganic additives for LPP are those that can form an insoluble inorganic-based mineral of targeted charged species in a saline stream. Such inorganic additives should preferably be recoverable and recyclable, useable as a useful by-product, or produced locally from reject or waste streams. Such inorganic additives should also not themselves constitute pollutants. Several inorganic additives were indentified, developed, and tested for LPP.

A second targeted improvement for LPP is to produce controllable precipitates that are uniformly distributed with high yield and preferably in submicron sizes. Submicron precipitates are fundamentally stable and form spontaneously if a narrow resistance time distribution is improvised and/or a surface active agent (naturally existing or induced) sufficiently acts as a dispersant to prevent immediate agglomeration of the newly formed precipitates. Submicron precipitates are thus dispersed phase with extreme fluxionality. On the other hand, non-spontaneous unstable macro-size precipitates will form if given sufficient time to rest.

The state (stabile, metastabe, or unstable) of given precipitates can be expressed thermodynamically by the Gibbs-Helmholtz relation as follows:

$$\Delta G = \Delta H - T \Delta S \quad (1)$$

where $\Delta G$ is the free energy of precipitates (provided by, for instance, mechanical agitation or other means), $\Delta H$ is the enthalpy that represents the binding energy of the dispersed phase precipitates in the saline stream, T is the temperature, and $\Delta S$ is the entropy of the dispersed phase precipitates (the state of precipitates disorder). The binding energy ($\Delta H$) can be expressed in terms of the surface tension ($\tau$) and the increase in the surface area ($\Delta A$) as follows:

$$\Delta G = \tau \Delta A - T \Delta S \quad (2)$$

When the introduced free energy into the saline stream exceeds the binding energy of precipitates, individual precipitates are broken down and redistributed. In addition, when a surface active agent is present in the saline stream as an effective dispersant, $\tau$ is reduced and thus the precipitates binding energy is diminished. Furthermore, part of the introduced energy may not contribute to precipitates deflocculating but it dissipates in the aqueous stream in the form of heat which reduces viscosity. All of these factors increase precipitates disorder (positive entropy). As such, the change in the entropy ($\Delta S$) quantitatively defines precipitates dispersion.

The Compressed-Phase Precipitation (CPP) process is thus developed to achieve sub-micron precipitates in certain applications. CPP is conceptually similar to LPP in which the targeted inorganic species must be nearly insoluble in the amine solvent whereas the mother solvent (water) is miscible with the amine solvent. However, the difference is that fluids in the CPP process can be subjected to pressure and/or temperature manipulations, or fluids modifications to force unusual thermo-physical properties (e.g., exhibit liquid-like density but with higher diffusivity, higher compressibility and lower viscosity).

The fast diffusion combined with low viscosity of a compressed amine solvent into an aqueous phase produces faster supersaturation of targeted ionic species, and their possible precipitation in the desired and sub-micron and micron sizes. Thus, the precipitate-size as well as the precipitate-size distribution, morphology, and crystal structure can be controlled. Achieving faster supersaturation would, in turn, minimize the use of the amine solvent, reduce the size of precipitation vessels, and allow the recovery of targeted ionic species in the desired precipitates shape and distribution.

Several factors could influence the performance of the precipitation process. Among such factors are: (1) the origin of the saline stream along with the identity and concentrations of its targeted ionic species; and (2) the way the additive (inorganic, organic, or both) is premixed or mixed with the saline stream to induce precipitation.

Flue Gas Waste Heat Recovery and Scrubbing

The co-generation plants are based on steam turbines, combined-cycle gas turbines as well as a variety of backup turbines. The mainstay units for energy generation (power and heat) are water boilers. Heavy oil, crude oil, gas oil, and natural gas are used to fuel the co-generation plants. The sulfur content varies in such fuels from a very small concentration to a relatively high concentration (3-8% by weight). The emission of sulfur dioxide ($SO_2$) in particular is therefore of a prime concern. The plants are not equipped with flue gas scrubbers. It is also the practice in summer time to allow turbines to exhaust directly to atmosphere (by-passing dampers and stacks) for the purpose of slightly increasing turbines' outputs.

Boilers' efficiency is defined as the difference between the energy input (fuel) and energy output (steam). The typical range of boilers' efficiency is 75-85%. One of the sources for efficiency loss is caused by incomplete combustion, which arises from a shortage of combustion air or surplus of fuel or poor distribution of fuel (for well operated boilers, such a loss can be limited to about 0.5%). A second source of efficiency loss is attributed to radiation/convection across boilers' insulation, which is relatively small at higher boilers loads (1-2%) but it becomes larger at lower boilers loads. A third source of efficiency loss is within boilers' blow down (1-3%). However, the largest efficiency loss is attributable to boilers' flue gas emission, which accounts for 15-20% of energy input. Thus, flue gas represents a significant waste heat energy that consists of sensible and latent heat of water vapor condensation.

Even though some plants utilize "best boilers practice" to maximize overall boilers' efficiency (e.g., oxygen-trim for combustion air control, conventional feed water economizers to emit flue gas at 145-175° C., recycling of steam condensate, and boilers blow down heat recovery), a significant amount of thermal energy is still wasted with flue gas.

The type of fuel, temperature, dew point, and total enthalpy are among the most important factors that influence flue gas emission, abatement, and waste heat recovery. Table 3, for example, shows the analysis of heavy oil and natural gas. Heavy oil contains sulfur that causes acid corrosion problems. Natural gas, on the other hand, is a cleaner fuel than heavy oil but it has higher hydrogen content than oil, and therefore its flue gas contains more water vapor. As such, natural gas is inherently less efficient fuel than oil. However, flue gas from the combustion of natural gas contains larger amounts of latent heat than flue gas from oil combustion.

Boilers are designed to operate at a certain flue gas temperature, which is dictated by the type of fuel. Flue gas temperature is thus a refection of boilers' efficiency. The rule of thumb is that boilers' efficiency improves by 1% for every 4.5° C. drop in the temperature of flue gas. Higher flue gas temperatures indicate less efficient boilers (e.g., deposits on heat transfer surfaces).

The dew point of flue gas defines as the saturation temperature of the water vapor at its partial pressure. In other words, it is the temperature at which water vapor in flue gas starts to condense. Condensation of flue gas from fuel oil combustion reduces $So_2$ and promotes sulfurous and sulfuric acids. The dew point of such acids is higher than the dew point of water vapor, and therefore flue gas is typically vented above 175° C. to avoid corrosion.

Figure 5:
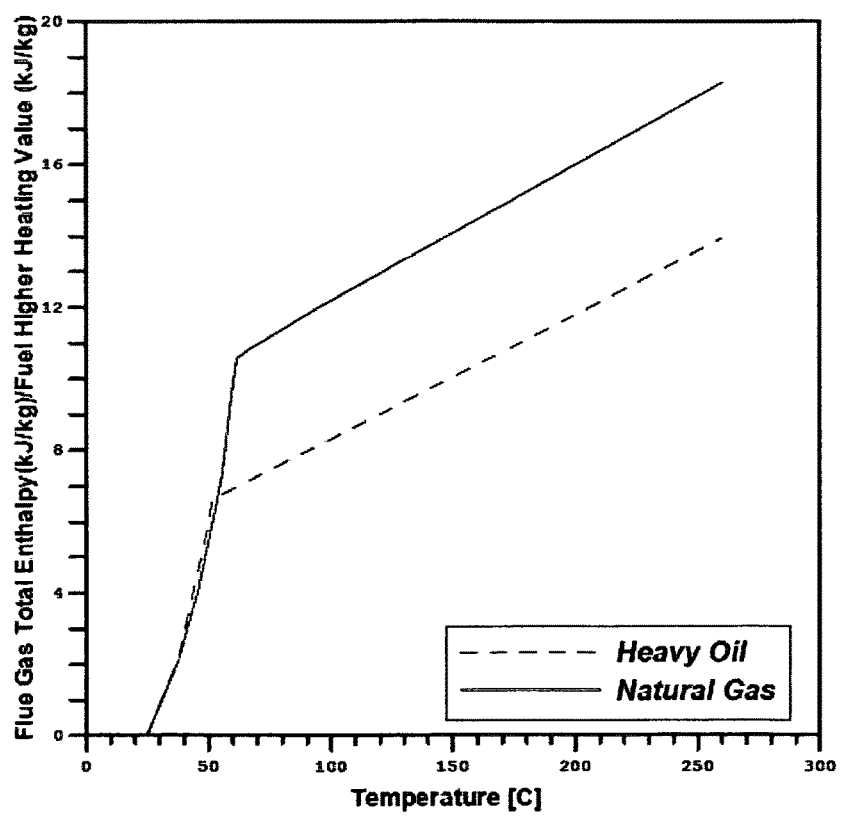
FIG. 5 illustrates the ratio of the "flue gas total enthalpy" to the "fuel high heating value" of a given temperature.
Figure 6:
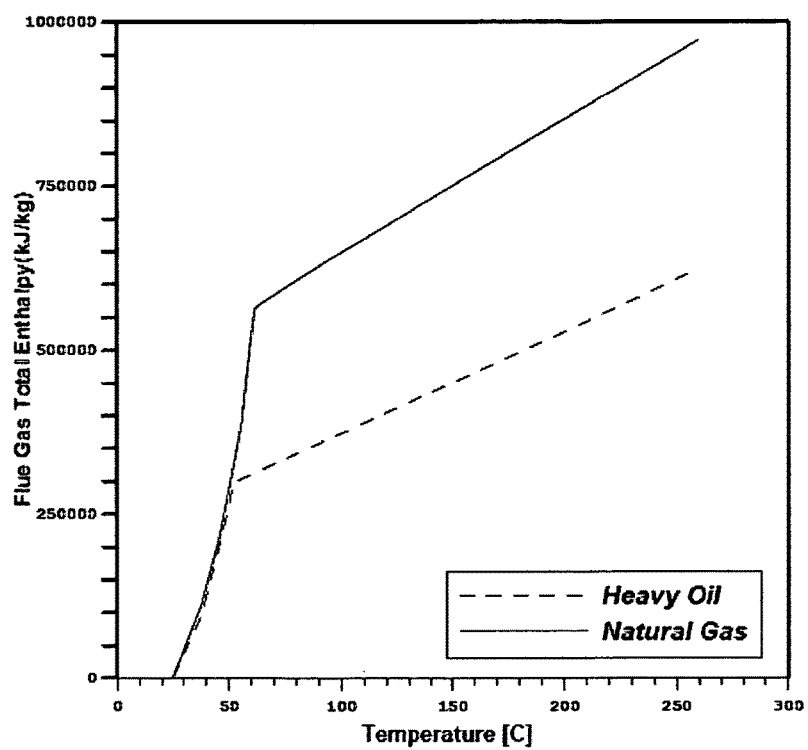
FIG. 6 illustrates the "flue gas total enthalpy" at the "fuel high heating value" of a given temperature.

The waste heat energy in flue gas is the sum of the enthalpies of its species at the reference conditions of 25° C. and 1.01 bar. Above the initial dew point, water vapor in flue gas is in a superheated state. FIG. 5 depicts the ratio of the "flue gas total enthalpy" to the "fuel high heating value" of a given temperature. Such a ratio reflects boilers' inefficiency due to flue gas emission. FIG. 6, on the other hand, shows "flue gas total enthalpy" (kJ/kg) at the "fuel high heating value" of a given temperature. It indicates that waste heat energy within flue gas, is substantial and should not be wasted.

The kinks in the slopes of FIGS. 5 and 6 reflect the initial dew points of water vapor. Sensible heat, which is about half of the waste heat energy within flue gas, is recoverable at higher temperatures. Latent heat, on the other hand, constitutes nearly the other half of waste heat energy within flue gas at lower temperatures. The recovery of latent heat below the initial dew point, however, is critically important since its troublesome to recover (e.g., corrosion issues and drain back condensate into boilers stack), yet the amount of energy available per degree drop in the temperature of flue gas is much greater than the sensible heat. As such, methods to recover waste heat energy must target both sensible heat as well as latent heat (typically avoided) of water vapor condensation in flue gas.

FIGS. 5 and 6 also reveal that flue gas from the combustion of natural gas carries higher waste heat than that from the combustion of fuel oil. This is attributed to the higher amount of hydrogen in natural gas (Table 3). For every kg of hydrogen in the fuel, about 4 kg of superheated water vapor is formed. Upon combustion of natural gas, for example, 15-20% of natural gas is instantly vaporized (lost) to form water vapor since hydrogen in natural gas combines with oxygen in combustion air. As such, the formation of water vapor depletes energy from the fuel that can not be recovered unless water vapor is effectively condensed back out of the flue gas. When water vapor is condensed, the recovered latent heat would be 2,279 kJ/kg, and each kg of such recovered latent heat would reduce, for example, the consumption of natural gas by 2.2 $ft^3$. The amount of hydrogen in the fuel has therefore a much greater effect on the amount of latent heat.

The co-generation plants, for example, create tremendous and different forms of waste that can be captured and reused. Such forms of waste include rejected cooling seawater from turbine condensers and from heat rejection sections of desalination trains, flue gas, and flue gas waste heat. A portion of the rejected cooling seawater can be de-scaled and used as a scrubbing fluid for flue gas and as an IOR fluid for oil-fields, flue gas can be de-sulfurized to protect the environment and liberate $CO_2$ for oil-fields EOR, and flue gas waste heat can be recovered to, for instance, heat make-up water for the boilers of the power plants or pre-heat seawater for desalination trains.

De-Scaling

One of two approaches to de-scale seawater or rejected cooling seawater from turbine condensers or from heat rejection sections of desalination trains can be conducted in this invention. The first approach is based on dual-stage precipitation whereas the second approach is based on single-stage precipitation.

Dual-Stage Precipitation

The first approach is based on precipitating magnesium in the form of hydroxide (brucite) and then precipitating sulfate in the form of either calcium sulfoaluminate or calcium sulfoferrate. Brucite is precipitated upon the addition of an appropriate amount of a hydroxide source followed by the precipitation of either calcium sulfoaluminate or calcium sulfoferrate upon the addition of an appropriate amount of either an aluminum or iron source along with, if needed, an excess amount of a hydroxide source.

The hydroxide source can be an inorganic-based additive, an organic-based additive, or a combination of such additives. The possible hydroxide source of the inorganic-based additive is calcium chloroaluminate, calcium chloroferrate, lime, and hydrated lime. The possible hydroxide source of the organic-based additive is ammonia, methylamine, ethylamine, isopropylamine, propylamine, dimethylamine, diethylamine, diisopropylamine, and dipropylamine.

The possible aluminum source includes calcium chloroaluminate, aluminum chlorohydrate, calcium aluminate, sodium aluminate, aluminum acetate, aluminum chloride, and aluminum nitrate. The possible iron source includes calcium chloroferrate, calcium ferrate, sodium ferrate, iron chloride, and iron nitrate.

Single-Stage Precipitation

Table 1 reveals that calcium in seawater constitutes about 20% of the total divalent cations (calcium and magnesium). The averaged ratio (meq./L) of sulfate to the total divalent cations is about 40% whereas the averaged ratio of sulfate to magnesium is about 48%. Since the concentration of magnesium is almost double the concentration of sulfate, magnesium would be a sufficient and appropriate precipitation sink for sulfate to be precipitated as a useful layered double hydroxides based-mineral if it's supplemented with an appropriate trivalent cation along with a hydroxide source. The structure of such a mineral would then stem from the basic structure of brucite, which is the octahedral of magnesium (six-fold coordinated to hydroxyl groups) that share edges to form stacked layers held together by hydrogen bonding. When some of the magnesium ions are replaced by a trivalent cation having nearly an equivalent ionic radius (e.g., $Al^{+3}$ or $Fe^{+3}$), a net positive charge is permanently generated in the hydroxyl layers. This net positive charge is balanced by an interlayer of negatively charged anions (sulfate or sulfate-chloride in the case of seawater) that lies between the brucite-like layers. The free space of the interlayer is filled with water molecules. The structural features of such layered double hydroxides based-mineral are thus dictated by the: (1) nature of the brucite-like layer; (2) identity of the anion or anions in the interlayer; and (3) way the brucite-like layers are stacked.

Calcium, as a divalent cation, can be combined within the structure of the close packed configuration of the hydroxyl groups in the brucite-like layers. However, calcium has a larger ionic radius (0.98° A) than magnesium (0.65° A). Thus, calcium may not be homogenously fitted within the octahedral structure of brucite-like layers, if calcium concentration relative to magnesium concentration is high.

Since calcium concentration is relatively small in seawater compared to magnesium concentration, calcium can be co-precipitated with the layered double hydroxides based-mineral without distorting the desired structure of such a mineral. This was verified in one of my experiments. The second approach to de-scale seawater can thus be conducted in one precipitation stage where sulfate is precipitated in the form of magnesium-calcium as layered double hydroxides upon the addition of an appropriate amount of either an aluminum or iron source along with an amount of a hydroxide source. The precipitated layered double hydroxides based-mineral would thus contain divalent cations (magnesium-calcium), rather than a divalent cation (magnesium), and a trivalent cation (aluminum or iron) in the outside layers while their interlayer contains mainly sulfate and water molecules. Within the outside layers, a fraction of the brucite sheets are substituted with aluminum or iron, which provides permanent positive charge on the hydroxide layers. The positively charged hydroxide layers are counter-balanced by the negatively charged sulfate interlayer.

For the second de-scaling approach (single-stage precipitation), the possible hydroxide source can be an inorganic-based additive such as aluminum hydroxide, iron hydroxide, magnesium hydroxide, and magnesium oxide; or an organic-based additive such as ammonia, methylamine, ethylamine, isopropylamine, propylamine, dimethylamine, diethylamine, diisopropylamine, and dipropylamine; or a combination of such inorganic- and organic-based additives. The possible aluminum source includes aluminum hydroxide, aluminum chlorohydrate, sodium aluminate, aluminum acetate, aluminum chloride, and aluminum nitrate. The possible iron source includes iron hydroxide, sodium ferrate, iron chloride, and iron nitrate.

De-Scaling, Flue Gas Waste Heat Recovery and Scrubbing

Dual-Stage Precipitation with Waste Heat Recovery and Flue Gas Scrubbing

Figure 7:
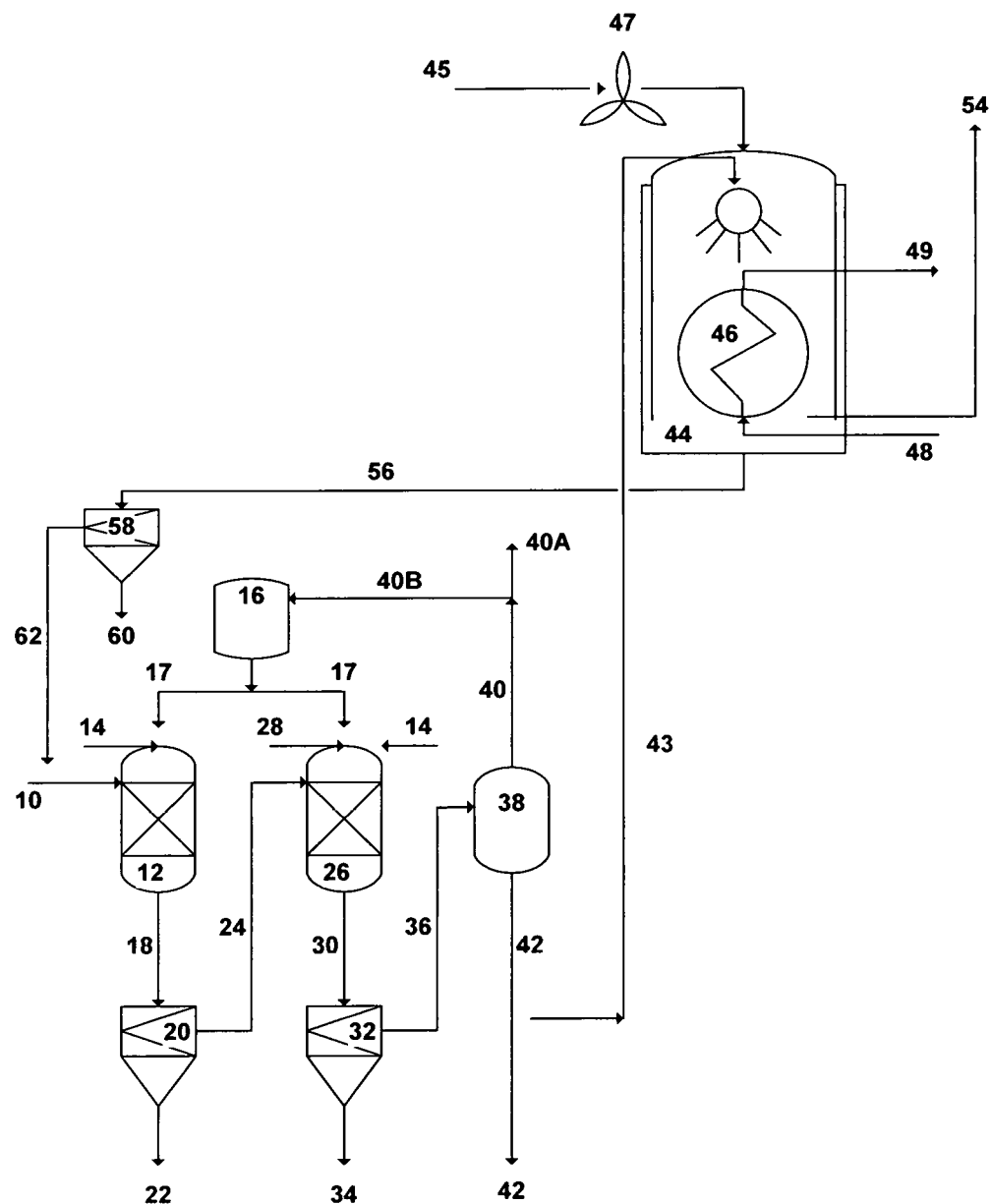
FIG. 7 illustrates a simplified flow diagram for dual-stage precipitation and indirect-contact heat condensing scrubber.

Reference is now made to FIG. 7, which depicts a simplified possible flow diagram for a dual-stage precipitation and an indirect-contact heat condensing scrubber. The dual-stage precipitation is aimed at precipitating brucite in the first stage and either calcium sulfoaluminate or calcium sulfoferrate in the second stage. Seawater, rejected cooling seawater from desalination trains, or the like of saline streams can be used as a feed stream. However, the advantage of using rejected cooling seawater is that such a stream is already pre-treated (at least by screening and chlorination). Seawater [10] is fed to the first precipitation unit [12] where it is intermixed with a hydroxide source to form selective brucite precipitates. The hydroxide source can be an inorganic-based additive [14], an organic-based additive [17], or a combination of such additives to form selective brucite precipitates. The outlet stream [18] from the first precipitation unit [12] is directed to the first appropriate filtration unit [20] to separate the formed brucite precipitates (slurry) [22] from the de-brucited seawater [24]. The brucite slurry [22] is subjected to further dewatering and dehydration (not shown in FIG. 7).

The de-brucited seawater [24] is then fed to the second precipitation unit where it is intermixed with an aluminum source or an iron source [28] along with, if needed, an excess of an inorganic-based hydroxide source [14] or an organic-based hydroxide source [17], to precipitate either calcium sulfoaluminate (upon the addition of an aluminum source) or calcium sulfoferrate (upon the addition of an iron source). The outlet stream [30] from the second precipitation unit [26] is then fed to the second appropriate filtration unit [32] to separate the formed precipitates (slurry) [34] from the de-scaled seawater [36]. The slurry of either calcium sulfoaluminate or calcium sulfoferrate [34] is subjected to further proper dewatering and dehydration (not shown in FIG. 7).

A plurality of precipitator units, intermixing devices (e.g., static mixers, premixing nozzles, concentric nozzles, spray nozzles, twin-fluid nozzles, Y-shaped nozzles, cross-shaped nozzles, or a combination of such nozzles), and filtration units (vacuum filters, press filters, hydrocyclones, centrifuges, media filters, micro filters, ultra filters, or a combination of such filters) can be used in each precipitation stage.

The de-scaled seawater [36] is then fed to a vapor-liquid equilibrium based stripping unit [38]. The stripping vapor-liquid equilibrium based unit can be selected from the group consisting of a vacuum vessel, a flash vessel, distillation, vacuum distillation, hydrophobic-membrane based distillation, hydrophobic-membrane based vacuum distillation, pervaporation, or a combination thereof. When the hydroxide source is an inorganic-based additive [14], the stripping unit [38] is used to strip off dissolved gases [40]. On the other hand, when the hydroxide source is an organic-based additive [17], the stripping unit [38] is used to strip off both [40] the organic-based additive and dissolved gases. The stripped off organic-based additive is then condensed (not shown) to segregate it [40B] from the non-condensable gases [40A] and recycled it recycled to the storage vessel [16] for reuse. The majority of the stripped and de-scaled seawater [42] is used as a suitable IOR fluid for oil-fields.

Since the stripped and de-scaled seawater [42] nearly consists of sodium-potassium chloride and its pH ranges between 9.0 and 9.5, a slip stream [43] (may be 1-2%) of this mildly caustic stripped and de-scaled seawater [42] is then fed to an indirect-contact heat condensing [46] scrubber [44] to scrub flue gas [45]. The scrubber [44] design also allows the recovery of most the sensible heat and a portion of the latent heat of the flue gas via the heat exchanger [46]. A fan, such as an induced-draft fan, may be needed to overcome the pressure drop across the heat exchanger [46]. The fan [47] should preferably be placed upstream of the heat exchanger [46] to avoid constructing it of fiberglass or stainless steel, but it must be suitable for the flue gas [45] high temperatures. The fan can also be placed downstream of the heat exchanger, but it must be constructed of either fiberglass or stainless steel. Because the scrubber [44] and the heat exchanger [46] are subjected to a corrosive environment (sulfurous and sulfuric acids), it is important that their construction materials be corrosion resistance (e.g., Teflon-coated or flake glass lining or other suitable corrosion resistance coating or materials).

Boilers within co-generation plants require large amounts of make-up water, which make them prime candidates for a condensing waste heat recovery since large amounts of heat can be transferred effectively from the flue gas [45] to the cold make-up water [48] via the heat exchanger [46]. The heated make-up water [49] via the heat exchanger [46] can be fed to, for example, a de-aerator for further heating before entering a boiler of a co-generation plant (not shown). Due to the ambient (low) temperature of the make-up water, the recovery of waste heat energy from the flue gas [45] condenses a significant portion of the water vapor from the flue gas.

One of two options is possible for using the slip stream [43] of the stripped and de-scaled seawater [42] for scrubbing. The first one, which is shown in FIG. 7, is to use the slip steam [43] in a once-through basis, by passing the spent slip stream [56] through a filtration unit [58] to remove particulate [60], and recycling the filtered slip stream [62] to the feed stream [10] of the de-scaling process. About 98% removal of $SO_2$ can be achieved in a single scrubbing stage, and the liberated $CO_2$ [54] can be used, for example, as an EOR fluid in oil-fields. The second option (not shown in FIG. 7) is to re-circulate the slip stream [43] through the scrubber [44], bleed a portion of the re-circulated spent slip stream [56], and use the slip stream [43] as make-up scrubbing water to balance the bled portion and maintain the pH in the scrubber [44] between about 5.5 and 6.

Figure 8:
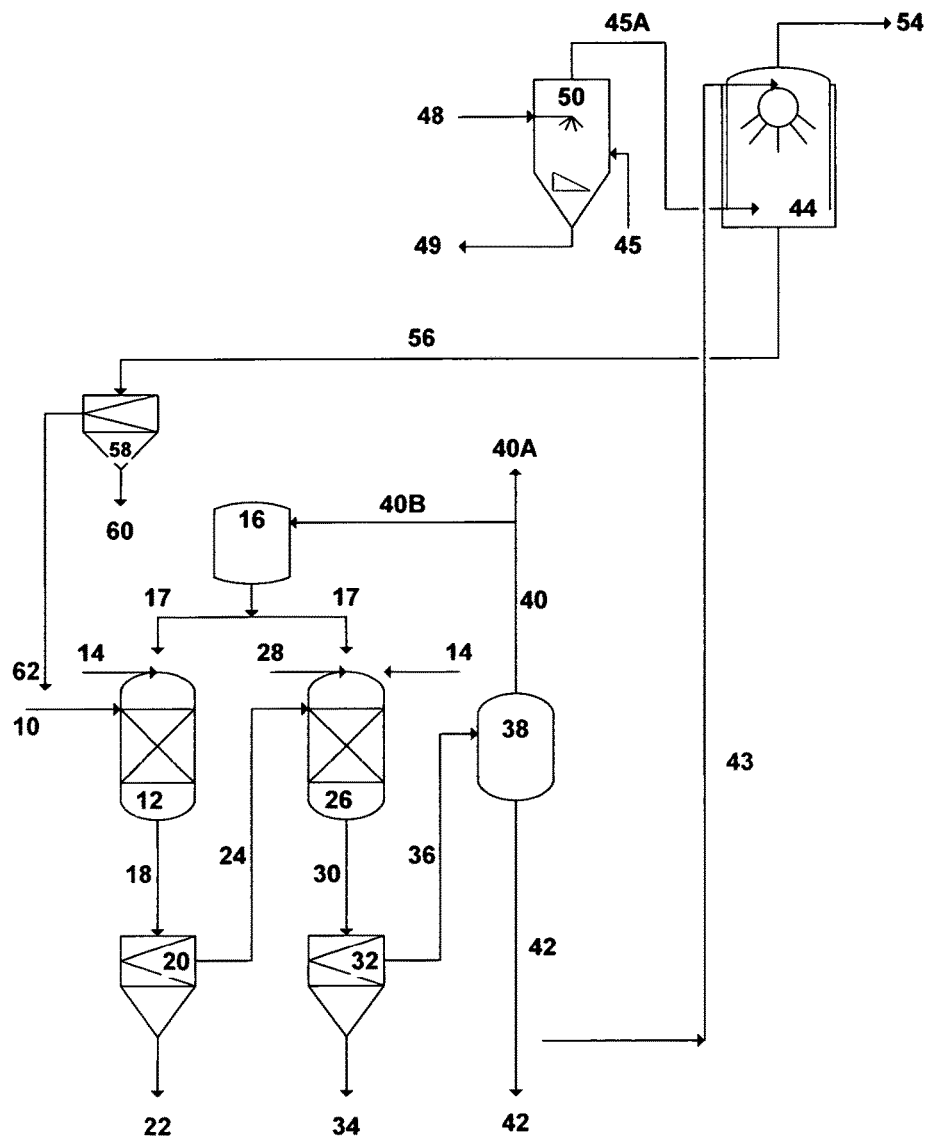
FIG. 8 illustrates a simplified flow diagram for dual-stage precipitation and direct-contact heat condensing scrubber.

FIG. 8 depicts a second alternative method, which is based on a dual-stage precipitation along with a direct-contact heat exchanger and a scrubber. The de-scaling processing steps [10-43] as well as the processing steps of the spent slip stream [56, 58, 60 and 62] in FIG. 8 are the same as given in FIG. 7 (described above). In the direct-contact heat exchanger [50] as shown in FIG. 8, heat is transferred between the flue gas [45] and quenching water [48] without an intervening wall. The elimination of an interfering wall increases the heat transfer rate between two fluids (flue gas and quenching water). The direct-contact heat exchanger [50] is ideal for transferring both sensible and latent heat from flue gas because spraying water droplets via, for example, open pipe injection ports, can provide a large heat transfer surface area in the presence of relatively small temperature differences between the flue gas [45] and quenching water [48]. The absence of tubes- or plates-types heat exchangers minimizes maintenance (no heat transfer surfaces exposed to corrosion), increases reliability, and reduces cost. As such, the direct-contact heat exchanger [50] severs as an effective scrubber-like waste heat energy recovery unit. It is ideal for co-generation plants since the quenching water [48] can be used as heated make-up water [49] for boilers in power plants, or seawater can be used as quenching water [48] and the pre-heated seawater [49] feeds desalination trains. The heated make-up water or pre-heated seawater [49], however, should be filtered and the pH should be adjusted (not shown in FIG. 8). It is worth noting that the direct-contact heat exchanged [50] can be installed within the scrubber [44], maintaining the same arrangement for the quenching water [48] and the heated water [49].

The quenched flue gas [45A] and a slip stream [43] of the stripped and de-scaled seawater [42] are then fed to the scrubber [44] to scrub the quenched flue gas. The processing steps of the spent slip stream [56, 58, 60 and 62] as given in FIG. 8 are similar to the processing steps [56, 58, 60 and 62] as given in FIG. 7 (described above). The removal of $SO_2$ is about 99%, and the liberated $CO_2$ [54] can be used, for instance, as an EOR fluid in oil-fields.

It should be pointed out that if greater than 99% of $SO_2$ removal is required (less than 5 ppmv), a compacted vertical dual-stage packed-bed scrubber would also be an alternative scrubbing method with the direct-contact heat exchanger since the exchanger quenches flue gas and liberate it from particulate, and the slip stream of the mildly caustic de-scaled seawater is ideal (free of scale prone species) for a packed-bed scrubber. The de-scaled seawater can be fed separately to each packed-bed stage. The scrubbed flue gas in the first packed-bed passes though to the second stage packed-bed via a "trap-out tray" that separates the first and second stage to achieve the low outlet $SO_2$ concentration limit. The second stage packed-bed acts as $SO_2$ polishing step.

Figure 9:
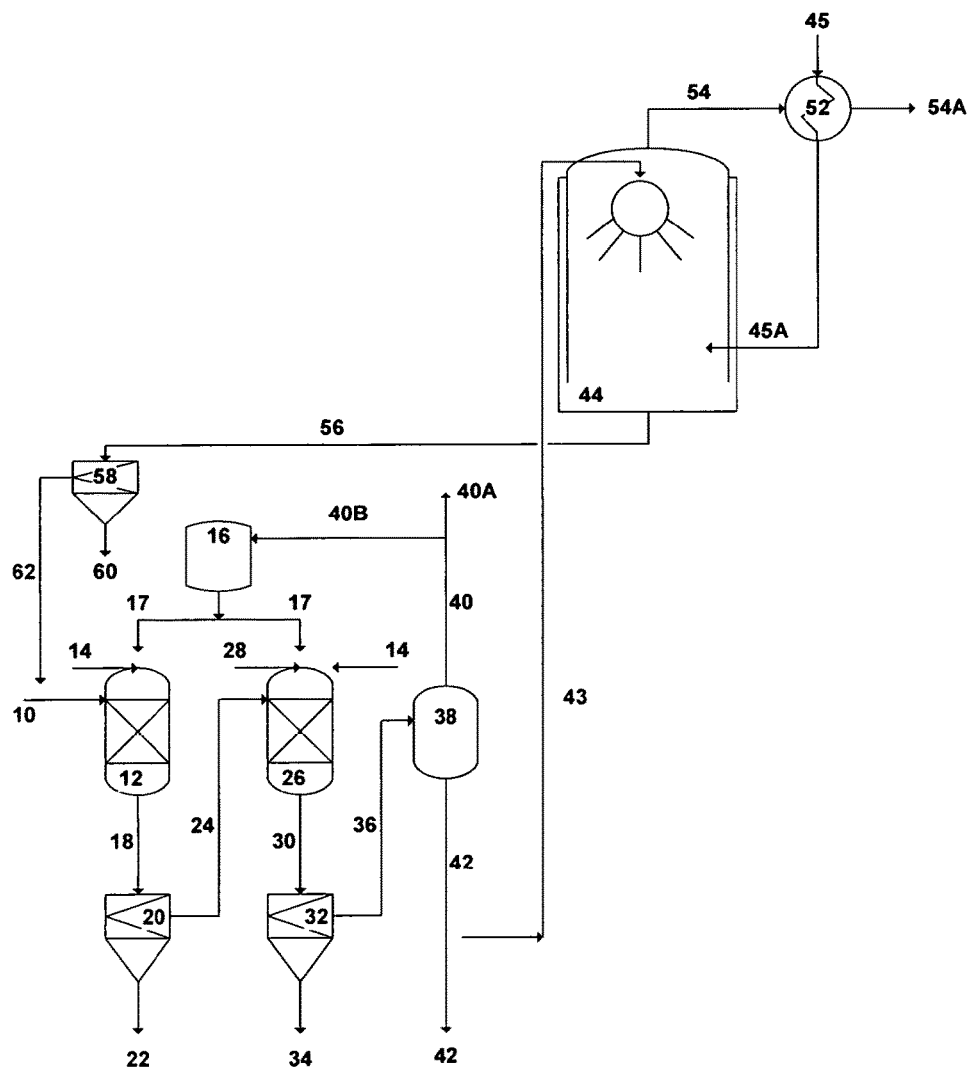
FIG. 9 illustrates a simplified flow diagram for dual-stage precipitation, heat pipe exchanger and scrubber.

FIG. 9 depicts a third alternative method, which is based on a dual-stage precipitation along with a heat pipe exchanger [52] and a scrubber [44]. The de-scaling processing steps [10-43] and the processing steps of the spent slip stream [56, 58, 60 and 62] in FIG. 9 are the same as given in FIG. 7 (described above). The heat pipe exchanger [52] as shown in FIG. 9 is used to transfer heat from the flue gas [45] to $CO_2$ exiting [54] the scrubber [44]. The heat pipe exchanger is compact, operates with low temperature differentials, and has no moving parts to malfunction. Flue gas quenching with the heat pipe exchanger [52] allows the use of rubber lining in the scrubber [44] as protection against corrosion. The quenched flue gas [45A] and a slip stream [43] of the stripped and de-scaled seawater [42] are then fed to the scrubber [44] to scrub the quenched flue gas. The removal of $SO_2$ can be about 95% in a single scrubbing stage. The liberated $CO_2$ [54] is preheated [54A] via the heat pipe exchanger [52] to be used, for instance, as an EOR fluid in oil-fields.

Single-Stage Precipitation with Different Waste Heat Recovery and Flue Gas Scrubbing The single-stage precipitation with different configurations of flue gas waste heat recovery and scrubbing can be conducted in similar ways as described in FIGS. 7, 8 and 9, except: (1) the processing steps of the first precipitation stage [12, 14, 17, 18, 20, 22 and 24] are eliminated; and (2) the processing steps [10, 14, 16, 17, 26, 28, 30, 32, 34, 36, 38, 40, 40A, 40B, 42, and 43] of the second precipitation stage (the only stage) are described as follows. As such, seawater[10] is fed to the precipitation unit [26] where it is intermixed with an aluminum source or an iron source [28] along with, if needed, an excess hydroxide source [17] in the case of using an organic-based hydroxide additive) to precipitate either magnesium-calcium sulfoaluminate or magnesium-calcium sulfoferrate. The advantage of using aluminum hydroxide or iron hydroxide [28] is that it serves as a dual source for both the trivalent cation and the inorganic-based hydroxide. A different inorganic-based hydroxide source [14] may be used and introduced to the precipitation unit [26]; independent of the aluminum or iron source [28].

The outlet stream [30] from the precipitation unit [26] is then fed to an appropriate filtration unit [32] to separate the formed precipitates (slurry) [34] from the de-scaled seawater [36]. The slurry of either magnesium-calcium sulfoaluminate or magnesium-calcium sulfoferrate [34] may be subjected to further dewatering, dehydration as well as possibly calcination and activation (not shown).

The de-scaled seawater [36] is then fed to a vapor-liquid equilibrium based stripping unit [38]. The stripping vapor-liquid equilibrium based unit is selected from the group consisting of a vacuum vessel, a flash vessel, distillation, vacuum distillation, hydrophobic-membrane based distillation, hydrophobic-membrane based vacuum distillation, pervaporation, or a combination thereof. When the hydroxide source is an inorganic-based additive [14], the stripping unit [38] is used to strip off dissolved gases [40]. On the other hand, when the hydroxide source is an organic-based additive [17], the stripping unit [38] is used to strip off both [40] the organic-based additive and dissolved gases. The stripped off organic-based additive is then condensed (not shown) to segregate it [40B] from the non-condensable gases [40A] and recycled it to the storage vessel [16] for reuse. The stripped and de-scaled seawater [42] is used as a suitable IOR fluid for oil-fields.

The processing steps for the single-stage precipitation with different configurations of waste heat recovery and flue gas scrubbing [43-54 of FIGS. 7 and 8; 43-54A of FIG. 9] are as described above for the dual-stage precipitation with different configurations of waste heat recovery and flue gas scrubbing.

TABLE 1

Changes in Seawater Species Concentrations before and after Operating the Nearby Desalination Plants and Species Concentrations in Formation Water.

| Ions (mg/L) | 2006-Seawater Before Operating Plant I | 2009-Seawater After Operating Plant I | 2013-Seawater After Operating Plants I & II | Oil Wells Formation Water |
|---|---|---|---|---|
| $Na^+$ | 12,173 | 13,630 | 14,530 | 49,570 |
| $K^+$ | 423 | 524 | 611 | 2,150 |
| $Mg^{+2}$ | 1,529 | 1,886 | 2,145 | 2,880 |
| $Ca^{+2}$ | 530 | 667 | 699 | 13,340 |
| $Sr^{+2}$ | 5 | 7 | 8 | 440 |
| $Ba^{+2}$ | | | | 6 |
| $Cl^-$ | 22,000 | 25,550 | 27,710 | 103,250 |
| $HCO_3^-$ | 140 | 146 | 147 | 250 |
| $SO_4^{-2}$ | 2,700 | 3,770 | 4,100 | 330 |

TABLE 2

Properties of the Selected Organic Solvents.

| Fluid | Solubility in Water | $T_b$ ° C. | $C_p$ kJ/kg° C. | $H_v$ kJ/kg | $\Delta H_f^0$ kJ/kg |
|---|---|---|---|---|---|
| $NH_3$ | Highly Soluble | −33.45 | 2.19 | 1,370.8 | −2,695 |
| MA ($CH_5N$) | Extremely Soluble | −6.35 | 3.28 | 790.8 | −1,517 |
| DMA ($C_2H_7N$) | Extremely Soluble | 6.85 | 3.03 | 587.4 | −974 |
| EA ($C_2H_7N$) | Miscible | 16.55 | 2.85 | 621.8 | −1,644 |
| DEA ($C_4H_{11}N$) | Miscible | 55.45 | 2.44 | 380.4 | −1,418 |
| IPA ($C_3H_9N$) | Miscible | 32.45 | 2.77 | 460.1 | −1,900 |
| DIPA ($C_6H_{15}N$) | Highly Soluble | 83.95 | 2.64 | 341.9 | −1,765 |
| PA ($C_3H_9N$) | Miscible | 48.65 | 2.75 | 502.6 | −1,717 |
| DPA ($C_6H_{15}N$) | Soluble | 109.35 | | 368.6 | −1,543 |

$T_b$: Normal Boiling Point; $C_p$: Specific Heat Capacity; $H_v$: Heat of Vaporization at Normal Boiling Point; and $\Delta H_f^0$: Standard Enthalpy of Formation.

TABLE 3

Species of Heavy Oil and Natural Gas Fuels.

| Species | Heavy Oil | Natural Gas |
|---|---|---|
| Carbon | 85.50 | 74.40 |
| Hydrogen | 12.50 | 23.60 |
| Nitrogen | 0.00 | 0.76 |
| Oxygen | 0.00 | 1.22 |
| Sulfur | 2.50 | |
| Moisture | 0.00 | 0.00 |
| Ash | 0.00 | 0.00 |
| High Heating Value (kJ/kg) | 44,775 | 53,274 |

What is claimed is:

1. A method for treating a saline feed stream to produce a de-scaled saline stream, said method comprises the steps of separating magnesium and sulfate from said saline feed stream by mixing said saline feed stream with a hydroxide source and a trivalent cation source to form a precipitate comprising either magnesium sulfoaluminate or magnesium sulfoferrate in a precipitator unit, and filtering said precipitate by a filter to produce said de-scaled saline stream.

2. The method of claim 1, wherein said saline feed stream is selected from the group consisting of seawater, brine from seawater desalination plants, natural brine, brackish water, produced water, hydro-fracturing flow-back water, conventional flue gas desulphurization spent water, agricultural drainage water, acid mine drainage water, mineral slurry transport water, paper mills spent water, aluminum anodizing spent water, spent water from fertilizer production, lime slaking, spent water from textile production, and combinations thereof.

3. The method of claim 1, wherein said hydroxide source is selected from the group consisting of calcium chloroaluminate, calcium chloroferrate, lime, hydrated lime, ammonia, methylamine, ethylamine, isopropylamine, propylamine, dimethylamine, diethylamine, diisopropylamine, dipropylamine, and combinations thereof.

4. The method of claim 1, wherein said trivalent cation source comprises either an aluminum-based additive or an iron-based additive.

5. The method of claim 4, wherein said aluminum-based additive is selected from the group consisting of calcium chloroaluminate, aluminum chlorohydrate, calcium aluminate, sodium aluminate, aluminum acetate, aluminum chloride, aluminum nitrate, and combinations thereof.

6. The method of claim 4, wherein said iron-based additive is selected from the group consisting of calcium chloroferrate, calcium ferrate, sodium ferrate, iron chloride, iron nitrate, and combinations thereof.

7. The method of claim 1, wherein said de-scaled saline stream further comprises the steps of separating said magnesium and said sulfate from said saline feed stream by: (a) mixing said saline feed stream with said hydroxide source to form a first precipitate comprising brucite in a first precipitator unit, and filtering said first precipitate by a first filter to produce a de-brucited saline stream; and (b) separating said sulfate from said de-brucited saline stream by mixing said de-brucited saline stream with said trivalent cation source to form a second precipitate comprising either calcium sulfoaluminate or calcium sulfoferrate in a second precipitator unit, and filtering said second precipitate by a second filter to produce said de-scaled saline stream.

8. The method of claim 7, in step (b) further comprises mixing said hydroxide source with said de-brucited saline stream and said trivalent cation source.

9. The method of claim 1 or 7, wherein said de-scaled saline stream further comprises stripping said de-scaled saline stream by a vapor-liquid equilibrium unit to produce a de-scaled and stripped saline stream.

10. The method of claim 9, wherein said de-scaled and stripped saline stream further comprises using at least a portion of said de-scaled and stripped saline stream for hydrocarbons recovery.

11. The method of claim 9, wherein said de-scaled and stripped saline stream further comprises contacting at least a portion of said de-scaled and stripped saline stream with quenched flue gas in a scrubber to absorb sulfur dioxide from said quenched flue gas, and produce liberated carbon dioxide and a spent saline stream from said scrubber.

12. The method of claim 11, wherein said spent saline stream further comprises filtering to produce a filtered saline stream, and recycling said filtered saline stream to a saline feed stream.

13. The method of claim 11, wherein said spent saline stream further comprises re-circulating said spent saline stream through said scrubber, bleeding at least a portion of said spent saline stream, and adding at least a portion of said de-scaled and stripped saline stream to substitute the bled portion of said spent saline stream.

14. The method of claim 11, wherein said liberated carbon dioxide further comprises using at least a portion of said liberated carbon dioxide for hydrocarbons recovery.

15. The method of claim 11, wherein said quenched flue gas further comprises quenching flue gas by a fluid in a heat exchanger.

16. The method of claim 15, wherein said fluid to quench said flue gas in said heat exchanger comprises either make-up water or liberated carbon dioxide.

17. The method of claim 16, wherein said make-up water further comprises heating in said heat exchanger, said heat exchanger comprises an indirect contact heat exchanger.

18. The method of claim 16, wherein said make-up water further comprises heating in said heat exchanger, said heat exchanger further comprises a direct contact heat exchanger.

19. The method of claim 16, wherein said liberated carbon dioxide further comprises heating in said heat exchanger, said heat exchanger comprises an indirect contact heat exchanger.

* * * * *